US009811369B2

(12) United States Patent
Li et al.

(10) Patent No.: US 9,811,369 B2
(45) Date of Patent: Nov. 7, 2017

(54) METHOD AND SYSTEM FOR PHYSICAL COMPUTER SYSTEM VIRTUALIZATION

(71) Applicant: Sangfor Technologies Company Limited, Shenzhen (CN)

(72) Inventors: Xing Li, Shenzhen (CN); Linchun He, Shenzhen (CN)

(73) Assignee: SANGFOR TECHNOLOGIES COMPANY LIMITED, Shenzhen (CN)

( * ) Notice: Subject to any disclaimer, the term of this patent is extended or adjusted under 35 U.S.C. 154(b) by 160 days.

(21) Appl. No.: 14/870,314

(22) Filed: Sep. 30, 2015

(65) Prior Publication Data

US 2016/0092261 A1    Mar. 31, 2016

(30) Foreign Application Priority Data

Sep. 30, 2014   (CN) .......................... 2014 1 0526044

(51) Int. Cl.
*G06F 9/455* (2006.01)
*G06F 11/14* (2006.01)

(52) U.S. Cl.
CPC ...... *G06F 9/45558* (2013.01); *G06F 11/1458* (2013.01); *G06F 2009/45562* (2013.01); *G06F 2009/45579* (2013.01); *G06F 2201/815* (2013.01)

(58) Field of Classification Search
None
See application file for complete search history.

(56) References Cited

U.S. PATENT DOCUMENTS

| | | | |
|---|---|---|---|
| 8,370,838 B1 * | 2/2013 | Omelyanchuk | G06F 11/3644 709/201 |
| 2005/0108709 A1 * | 5/2005 | Sciandra | G06F 9/505 718/1 |
| 2007/0260831 A1 * | 11/2007 | Michael | G06F 9/4401 711/162 |
| 2013/0185721 A1 * | 7/2013 | Ikegami | G06F 9/45558 718/1 |
| 2014/0229697 A1 * | 8/2014 | Colbert | G06F 3/0617 711/162 |

* cited by examiner

*Primary Examiner* — Gregory A Kessler
(74) *Attorney, Agent, or Firm* — Anova Law Group, PLLC

(57) ABSTRACT

The present disclosure provides a physical computer virtualization method. The method includes receiving a virtualization instruction inputted by a user on a physical computer; restarting the physical computer; and loading the physical computer with a virtual machine management system mirror image file after restarting the physical computer to boot the physical computer into a virtual machine management system. The method also include obtaining physical disks of the physical computer; and creating a virtual machine through the virtual machine management system and using the physical disks of the physical computer.

18 Claims, 8 Drawing Sheets

METHOD AND SYSTEM FOR PHYSICAL COMPUTER SYSTEM VIRTUALIZATION

CROSS-REFERENCES TO RELATED APPLICATIONS

This application claims priority of Chinese Patent Application No. 201410526044.8, filed on Sep. 30, 2014, the entire contents of which are incorporated by reference herein.

FIELD OF THE INVENTION

The present invention generally relates to the field of computer technology and, more particularly, to a method and a related apparatus for physical computer virtualization.

BACKGROUND

Today's physical computer system virtualization process relies on the P2V technology. P2V, short for Physical To Virtual, refers to the migration of operation systems, applications or data from physical hard disks of a computer system to a virtual environment or disk partitions. That is, an operator of the physical computer system can only view the performance of the system of the physical computer running on a virtual machine after the physical computer system is migrated to the virtual machine over the physical computer.

The P2V technology for computer system virtualization uses mirror image creation tools, such as the WMWare converter, to create mirror image files the entire computer system. The mirror image files can then be copied to the virtual machine environment to be loaded to achieve P2V. A user has to wait until the completion of the P2V process to perform test on the virtualized operating system by accessing the virtual machine environment. Thus, the entire process can be complex and have a relatively long waiting time, making the operation less convenient.

The disclosed methods and systems are directed to solve one or more problems set forth above and other problems in the art.

BRIEF SUMMARY OF THE DISCLOSURE

One aspect of the present invention discloses a physical computer virtualization method. The method includes receiving a virtualization instruction inputted by a user on a physical computer; restarting the physical computer; and loading the physical computer with a virtual machine management system mirror image file after restarting the physical computer to boot the physical computer into a virtual machine management system. The method also include obtaining physical disks of the physical computer; and creating a virtual machine through the virtual machine management system and using the physical disks of the physical computer.

Another aspect of the present invention discloses a physical computer virtualization system. The physical computer virtualization system includes a virtualization instruction receiving module, a first image file booting module, a first physical disk locating module and a local virtualization module. The virtualization instruction receiving module is configured to receive a virtualization instruction inputted by a user on a physical computer and to restart the physical computer; the first image file booting module is configured to load the physical computer with a virtual machine management system mirror image file after restarting the physical computer to boot the physical computer into a virtual machine management system; the first physical disk locating module is configured to obtain physical disks of the physical computer system; and the local virtualization module is configured to create a virtual machine through the virtual machine management system, wherein disks of the created virtual machine uses the disks of the corresponding physical computer system:

Another aspect of the present invention discloses a physical to virtual migration system. The physical to virtual migration system includes a migration instruction receiving module, a second image file booting module, a second physical disk locating module, and a virtual machine migration module. The migration instruction receiving module is configured to receive a physical computer migration instruction inputted by a user on a physical computer and to extract a destination network address of a corresponding virtual machine management computer; the second image file booting module is configured to load a virtual machine management system image file after restarting the physical computer and to boot the physical computer into a virtual machine management system; the second physical disk locating module is configured to obtain physical disks of the physical computer; and the virtual machine migration module is configured to copy data on the physical disks of the physical computer and to send the data to the destination virtual machine management computer with the corresponding destination network address.

Other aspects of the present disclosure can be understood by those skilled in the art in light of the description, the claims, and the drawings of the present disclosure.

DETAILED DESCRIPTION

In order for those skilled in the art to better understand the technical solutions of the present invention, the followings together with accompanying drawings describe in detail the present invention with specific embodiments. The specific embodiments described herein are merely to illustrate the present invention and are not to limit the present invention.

Figure 1:
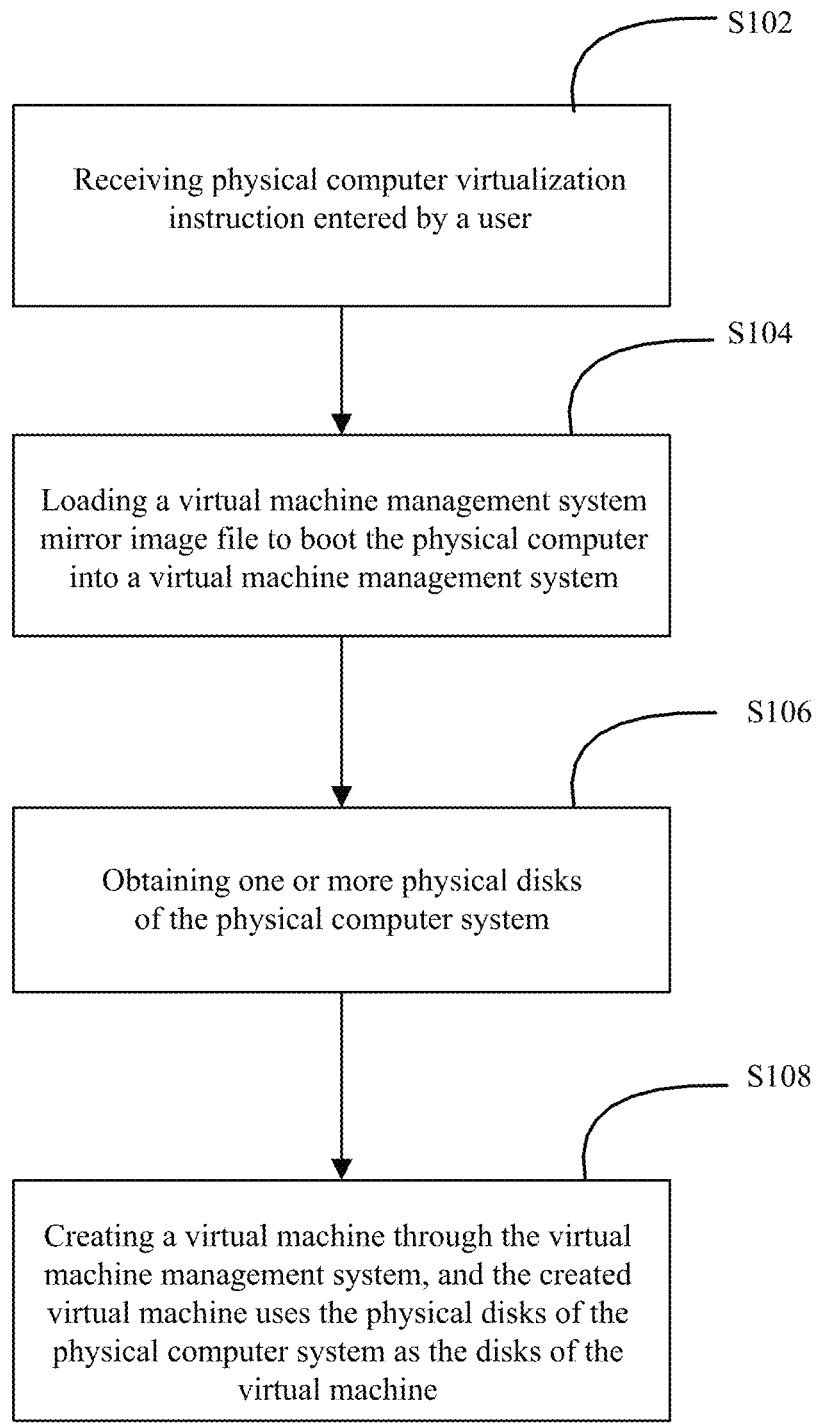
FIG. 1 illustrates a flow chart of an exemplary physical computer virtualization process consistent with the disclosed embodiments.

According to disclosed embodiments, a physical computer virtualization process is provided. The method may be implemented as computer program that can be run on a computer system based on the Von Neumann architecture. FIG. 1 illustrates a flow chart of an exemplary physical computer virtualization process according to disclosed embodiments.

As shown in FIG. 1, the physical computer virtualization process may include the following steps.

Step S102, at the beginning, a physical computer virtualization instruction entered by a user is received on the physical computer. For example, in operation, the user may invoke a computer virtualization application on the physical computer, and the virtualization application may allow the user to enter the physical computer virtualization instruction, and/or other virtualization parameters.

The virtualization instruction may also include other information about the virtualization. For example, the virtualization instruction may indicate whether the virtualization is local or remote, i.e., whether the virtualization is a local virtualization on the physical computer or a remote virtualization on a remote computer, as well as other information associated with the local or remote virtualization.

Step S104, after restarting the physical computer to start the virtualization process, a virtual machine management system mirror image file is loaded to boot the physical computer into a virtual machine management system.

Step S106, obtaining one or more physical disks of the physical computer system.

Step S108, a virtual machine is created by the virtual machine management system, and the created virtual machine uses the physical disks of the physical computer system as the disks of the virtual machine.

The virtual machine management system is the system booted from the virtual machine management program mirror image file, such as a hypervisor. In certain embodiments, the virtual machine management program may be based on the Linux operating system. And the virtual machine management system may be a mirror-image system on the Linux system including the virtual machine management program.

That is, after restart, the physical computer can be booted in a different boot sequence to load the mirror image file containing the virtual machine management program, which may create the virtual machine on the physical computer. In certain embodiments, the virtual machine may be a virtual machine corresponding to the physical computer, i.e., the physical computer is locally virtualized into the virtual machine based on, for example, the mirror image file or other predefined data representing the physical computer. In other embodiments, the virtual machine may also be a virtual machine modified from or different from the physical computer.

In addition, in Step S108, when the virtual machine (e.g., a first virtual machine) is created, the virtual machine is not allocated with virtual disks (e.g., using files or disk blocks virtualizing physical disks). Instead, the first created virtual machine may use the physical disks of the corresponding physical computer as the disks of the virtual machine. Thus, unlike a conventional virtual machine, which reads from or writes to files (virtual disks), the created virtual machine actually reads from or writes to the actual files or data on the physical computer. Thus, the operating system of the physical computer may be fully operated in the virtual machine mode.

That is, the user may not need to operate the physical computer to first migrate the system to a virtual machine management system. Instead, the physical computer may be restarted directly to load the mirror image file of the virtual machine management system and to be booted into the virtual machine management system, such that the locally created virtual machine on the physical computer can run or operate the physical computer system. Thus, the user may test the physical computer system running in the virtual machine mode without the need of P2V migration.

Further, the user may continue to create other virtual machines. Specifically, a virtual machine creation instruction and configuration parameters entered by the user can be obtained. Virtual disks may then be allocated according to the virtual machine configuration parameters and the virtual machines are created.

That is, after the user enters the virtual machine management system by rebooting the physical computer, the first virtual machine using the physical disks of the physical computer as the read/write addresses is automatically created. Afterwards, the user may create other virtual machines, and these user-created virtual machines may operate on allocated virtual disks, unrelated to the physical computer system described above. The user may enter the configuration information, such as the type of the virtual machine, the version of the virtual machine, and the hardware configuration parameters, etc., to create new virtual machines.

Further, after the virtual machine is created through the virtual machine management system, a virtual machine status check request from the user is obtained, status information of the created virtual machine is obtained, and a response based on the status information is returned through a WebUI interface.

That is, the user may access the physical computer through a browser to issue the virtual machine status check request. The virtual machine management system of the physical computer may return the status information of the currently created virtual machine through the webUI interface to the user. Thus, through the web page of the webUI, the user may get the virtual machines status information, such as, which virtual machines are running and the operation status of the virtual machines, etc.

Further, after the virtual machine is created through the virtual machine management system, a virtual machine backup request is obtained, and a corresponding virtual machine identifier and a backup address are extracted. And the disks or files of the virtual machine with the corresponding virtual machine identifier are backed up to the backup address.

Specifically, the user may first select the virtual machine through the virtual machine operation status page, then select a backup option to back up the virtual machine. If the selected virtual machine is the virtual machine created with the read/write addresses corresponding to the physical computer's disks (i.e., the first virtual machine), then the disks of the physical computer are backed up. If the selected virtual machine is a virtual machine created later by the user, then corresponding files, which is a carrier of a corresponding virtual disk, of the virtual machine are backed up to the corresponding backup address. The backup address may be a storage location on the physical computer, may also be a network disk, shared disk and so on.

Figure 2:
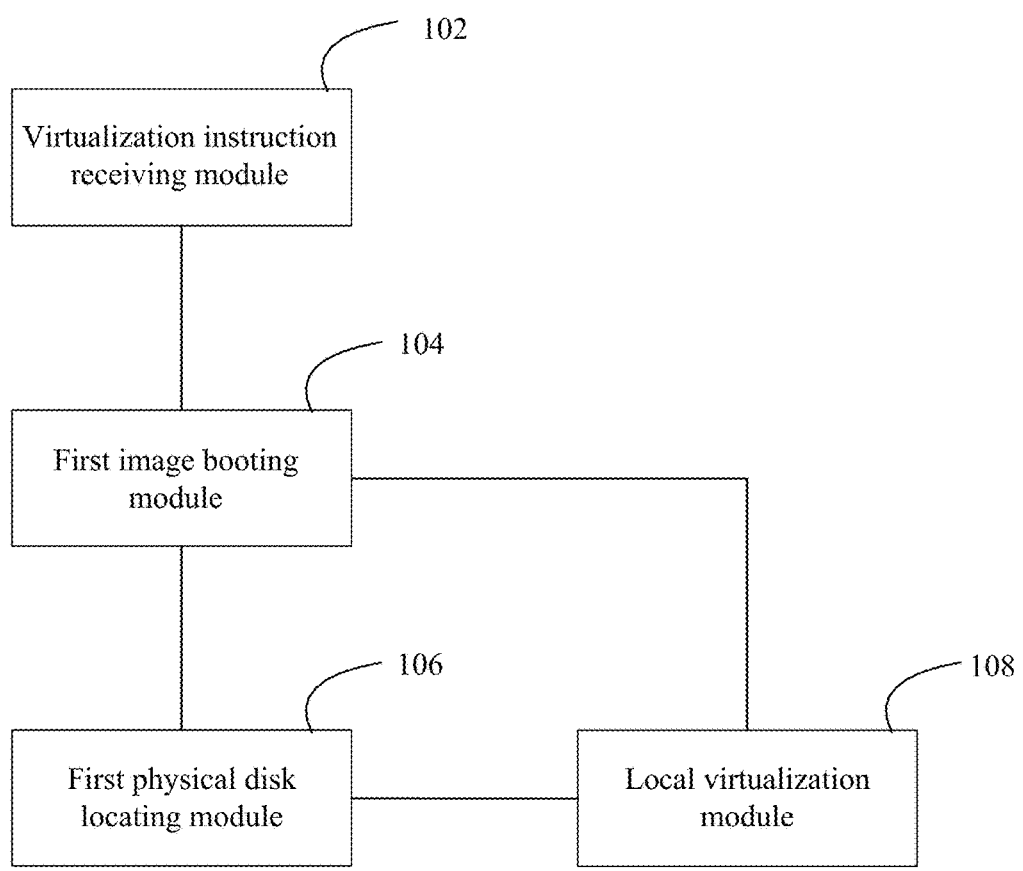
FIG. 2 illustrates a block diagram of an exemplary physical computer virtualization system consistent with the disclosed embodiments.

FIG. 2 illustrates a block diagram of an exemplary physical computer virtualization system according to disclosed embodiments. As shown in FIG. 2, the physical computer virtualization system includes a virtualization instruction receiving module 102, a first image booting module 104, a first physical disk locating module 106 and a local virtualization module 108. Other modules may also be included.

The virtualization instruction receiving module 102 is configured to receive a physical computer virtualization instruction entered by a user. The first image booting module 104 is configured to load a virtual machine management system mirror image file to boot the physical computer into the virtual machine management system. The first physical disk locating module 106 is configured to obtain one or more physical disks of the physical computer system. The local virtualization module 108 is configured to create a virtual machine by the virtual machine management system, and the created virtual machine uses the physical disks of the physical computer system as the disks of the virtual machine.

Figure 3:
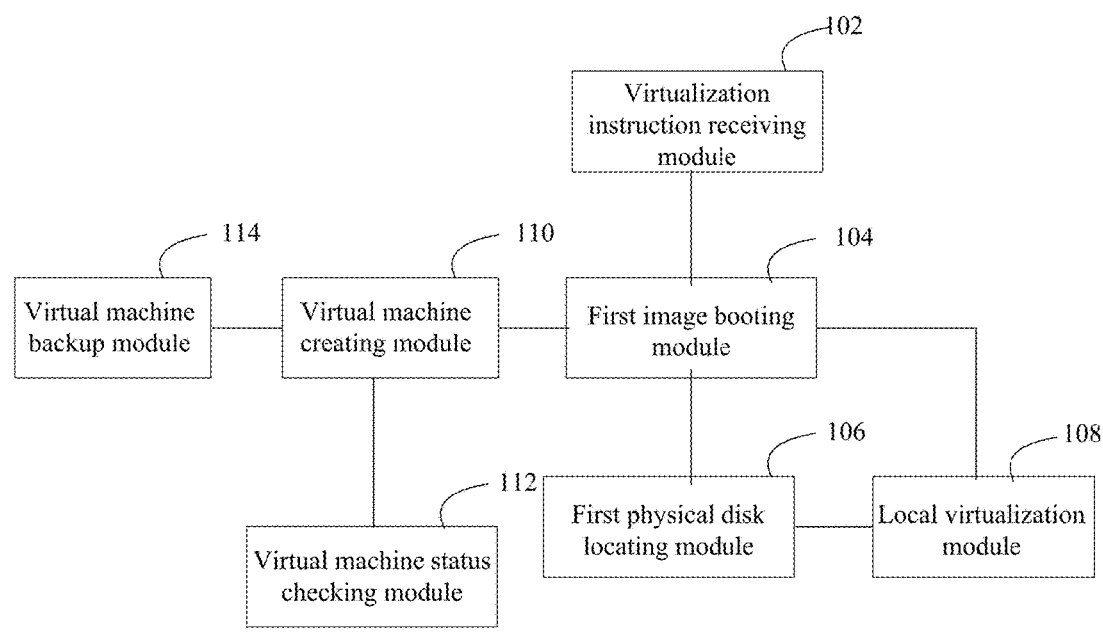
FIG. 3 illustrates a block diagram of another exemplary physical computer virtualization system consistent with the disclosed embodiments.

FIG. 3 illustrates a block diagram of another exemplary physical computer virtualization system according to disclosed embodiments. Based on the embodiments illustrated in FIG. 2, the physical computer virtualization system may further include a virtual machine creating module 110.

The virtual machine creating module 110 is configured to obtain a virtual machine creation instruction and configuration parameters entered by the user. The virtual machine creating module 110 is further configured to allocate virtual disks based on the configuration parameters of the virtual machine and to create the virtual machine.

Further, as shown in FIG. 3, the physical computer virtualization system also includes a virtual machine status checking module 112. The virtual machine status checking module 112 is configured to receive a virtual machine status checking request and to obtain the status information of the created virtual machine. And the virtual machine status checking module is further configured to return the status information of the created virtual machine by a response through a webUI interface.

Further, the physical computer virtualization system includes a virtual machine backup module 114. The virtual machine backup module 114 is configured to receive a virtual machine backup request, to extract a corresponding virtual machine identifier and a backup address, and to backup the disks or files of the virtual machine with the corresponding virtual machine identifier to the backup address.

Figure 4:
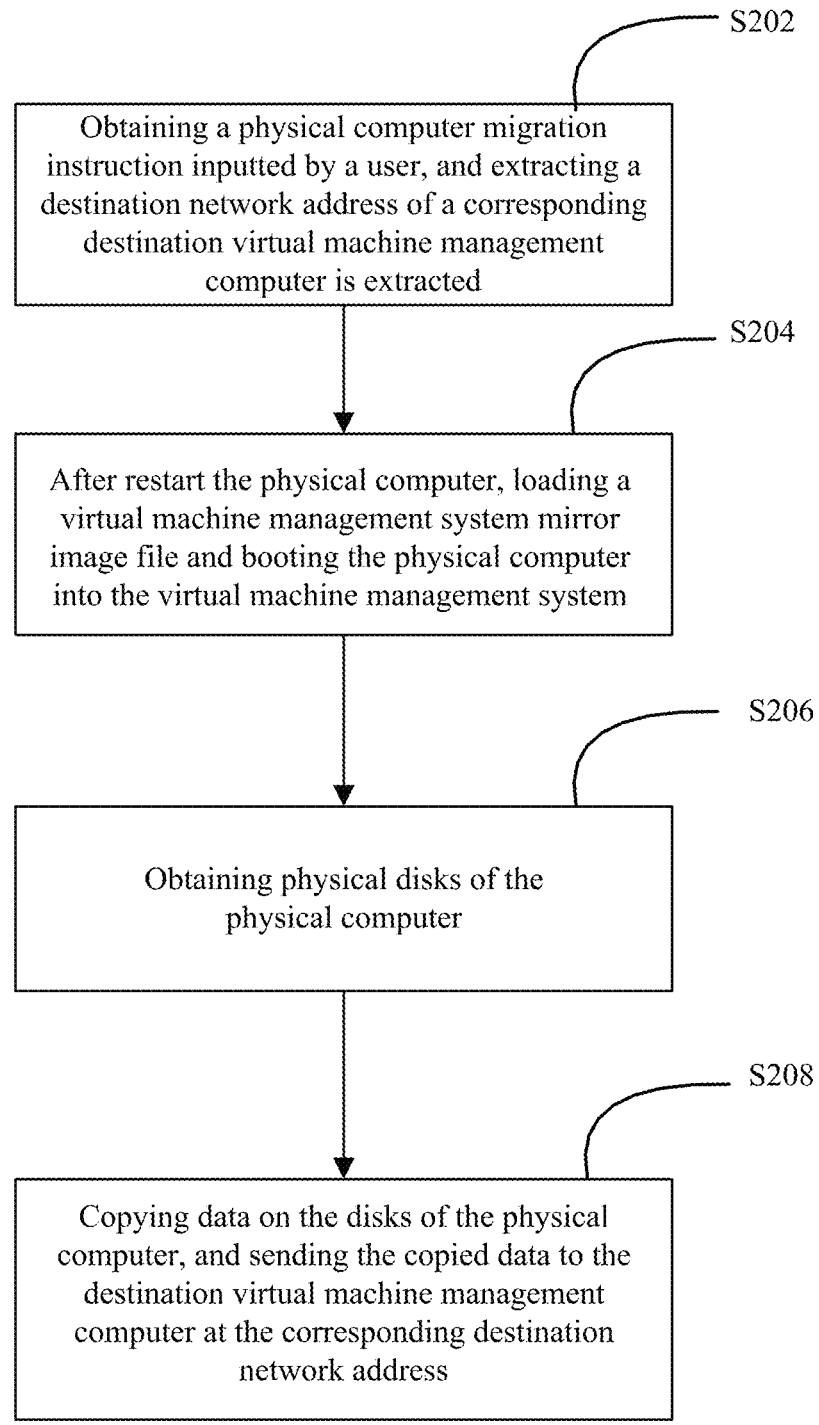
FIG. 4 illustrates an exemplary method to migrate a physical computer to a virtual machine consistent with the disclosed embodiments.

FIG. 4 illustrates an exemplary process to migrate a physical computer to a virtual machine according to disclosed embodiments. That is, instead of local virtualization of the physical computer, the physical computer may be migrated to a remote or networked virtual machine, i.e., remote virtualization. The migration process or the remote virtualization process may be implemented through computer program and may be run on a computer system based on the Von Neumann architecture. As shown in FIG. 4, the migration process may include the following steps.

Step S202, at the beginning, obtaining a physical computer migration instruction inputted by a user, and extracting a destination network address of a corresponding destination virtual machine management computer is extracted.

Step S204, after restarting the physical computer, loading a virtual machine management system mirror image file and booting the physical computer into the virtual machine management system.

Step S206, after the physical computer is booted into the virtual machine management system, obtaining physical disks of the physical computer.

Step S208, copying data on the disks of the physical computer, and sending the copied data to the destination virtual machine management computer at the corresponding destination network address. The data may include information for creating on destination virtual machine management computer a virtual machine corresponding to the physical computer and/or a virtual machine different from the physical computer based on predefined parameters and data.

Figure 5:
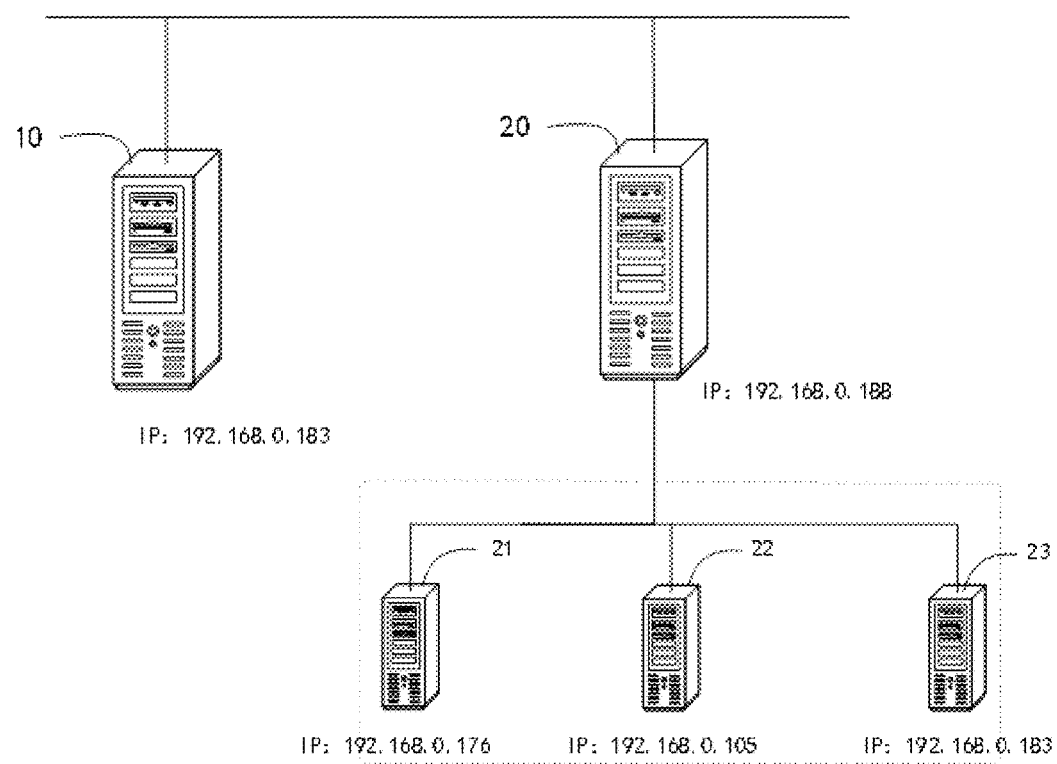
FIG. 5 illustrates a deployment diagram for a P2V migration process consistent with the disclosed embodiments.

FIG. 5 illustrates a schematic deployment diagram of a P2V migration process according to disclosed embodiments. As shown in FIG. 5, physical computer 10 is a source computer of a system migration process. Virtual machine management computer 20 is a destination computer of the migration process. The computer program which the migration method relies on may be running directly on the physical computer 10.

After a user runs an application computer program on the physical computer 10, the user may input destination information of the virtual machine management computer, such as, an IP address, a port number, etc., through a prompt box. After the user clicks to confirm the migration, a boot sequence of the operation system is modified. After restart, the physical computer 10 is booted into a predefined virtual machine management system based on a virtual machine management system mirror image file.

After entering the virtual machine management system, the data on the disks of the physical computer can be sent to the destination virtual machine management computer 20 by socket or other communication channels. The virtual machine management computer 20 may create a virtual machine before receiving the data. When the data are received, the data are written into the virtual disks of the created virtual machine. Thus, the user may see the migration progress when the user checks the status of the virtual machine.

In other embodiments, after the physical computer 10 is restarted, the disks of the physical computer may be either mapped to shared disks through an ISCSI protocol or mapped to virtual disks in an NBD (network block device) format. After the physical disks are mapped, the shared disks or the virtual disks may be provided to the virtual machines created by the virtual machine management computer 20.

The user may create multiple virtual machines on the destination virtual machine management computer 20. As shown in FIG. 5, virtual machines 21, 22, and 23 may be created on the destination virtual machine management computer 20, and each virtual machine may have its own IP address, among these virtual machines, virtual machine 23 may correspond to the physical computer, which has the same IP address.

Figure 6:
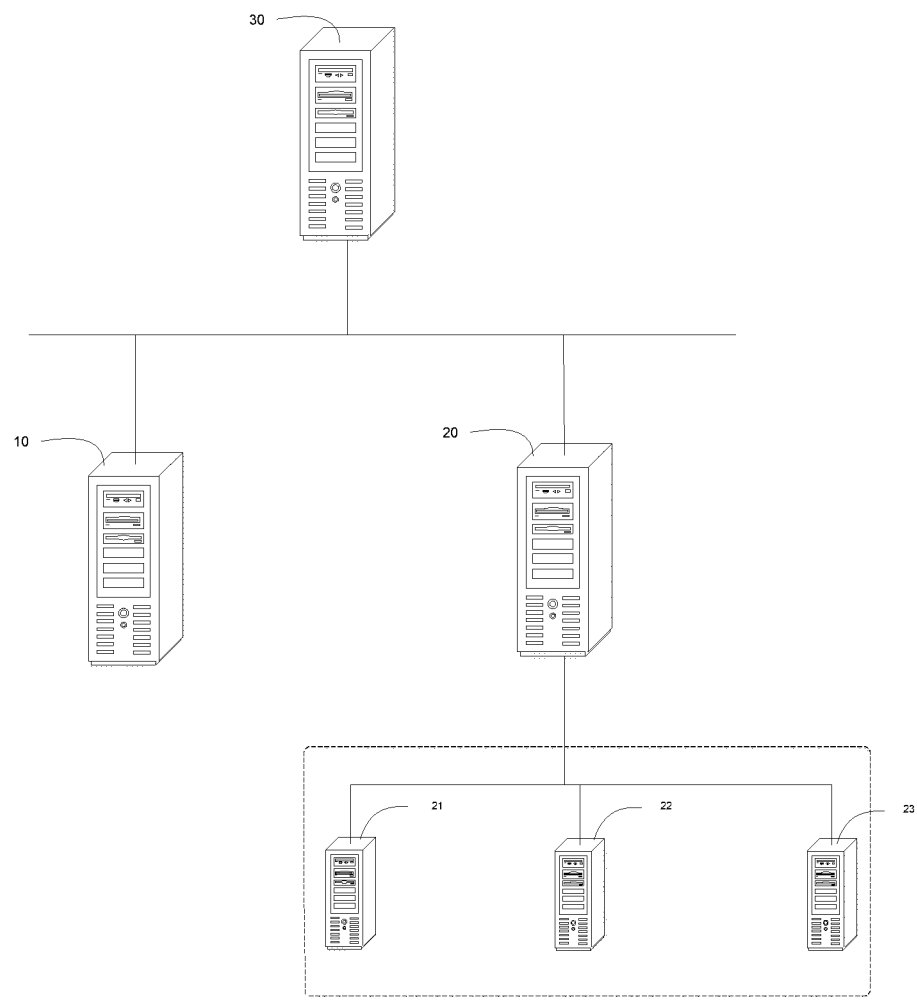
FIG. 6 illustrates a deployment diagram for multiple computers in a conventional P2V process.

FIG. 6 illustrates a schematic deployment diagram of multiple computers in a conventional P2V process. As shown in FIG. 6, in conventional technologies, the physical computer 10 is a source computer of the system migration process. The virtual machine management computer 20 is a destination computer of the migration. A plurality of virtual machines, such as 21 and 22, may be run or operated on the virtual machine management computer 20.

In order to migrate a system on the physical computer 10 to the virtual machine management computer 20 and be running as a virtual machine 23 on the virtual machine management computer 20, a separate facilitating computer 30 needs to be setup. A tool, such as "VMWare converter", is installed on the separate facilitating computer 30. After an IP address of the source computer and an IP address of the destination computer are configured or set up in the "VMWare converter", the physical computer 10 can be migrated.

Because, in conventional technologies, the system migration of the physical computer 10 needs to rely on the facilitating computer, it makes the operation less convenient. In comparison, the disclosed virtual machine migration processes do not need the facilitating computer to accomplish the P2V process, thus improving the operational convenience.

Further, returning to FIG. 4, before the virtual machine management system mirror image file is loaded after reboot, the disclosed physical computer to virtual machine migration method further includes obtaining hardware configuration information of the virtual machine inputted by the user, sending the hardware configuration information of the virtual machine as virtual machine creation parameters to the virtual machine management computer.

Specifically, before the user migrates the physical computer to the virtual machine management computer and runs the physical computer system in virtual machine mode, the user may define or setup the hardware configuration information of the virtual machine created by the virtual machine management system. For example, if the user wants the migrated system with high performance, the user may choose to configure more CPUs and more memories in the hardware configuration information. The physical computer and/or the virtual machine management computer may also automatically obtain the hardware configuration information of the virtual machine corresponding to the physical computer or to a predefined algorithm.

Further, after obtaining and sending out the inputted hardware configuration information of the virtual machine, a virtual machine hardware configuration information response returned by the virtual machine management computer can be received. Based on the response, it can be determined whether the virtual machine hardware configuration information satisfies a migration condition on the virtual machine management computer. If the response is positive, i.e., the virtual machine hardware configuration information satisfies the migration condition, the user is prompted to continue the migration. On the other hand, if the response is negative, i.e., the virtual machine hardware configuration information does not satisfy the migration condition, the user is prompted the failure or being unable to migrate.

For example, if the user configures a virtual machine on the virtual machine management computer to be run in 4 CPUs through the virtual machine hardware configuration information, but the virtual machine management computer has only 2 CPUs, the virtual machine management computer may return the virtual machine hardware configuration information response (a negative response) with related information, such as insufficient number of CPUs.

After the physical computer receives the response information, the physical computer parses the response information and determines that the virtual machine hardware configuration information configured by the user is too high, does not satisfy the migration condition. Therefore, the physical computer prompts the user that it is unable to migrate to the virtual machine management computer because the virtual machine hardware configuration information provided by the user cannot satisfy the migration condition.

Further, copying the data on the disks of the physical computer may include the following steps: obtaining a usage status bitmap information of the physical disks of the physical computer and, according to the bitmap information, copying the disks of the physical computer.

That is, during the computer migration, the physical computer may be migrated incrementally according to the bitmap information of the disks of the physical computer. For example, in one scenario, if the physical computer has migrated part of its data, the physical computer may only migrate the rest of the data that have not been migrated. In another scenario, after the physical computer has been migrated to the virtual machine management computer, new data may be generated or modified on the physical computer 10, which needs to be migrated again. In the subsequent migration process, based on the bitmap information, only the incremental part of information needs to be migrated, greatly saving migration time.

Figure 7:
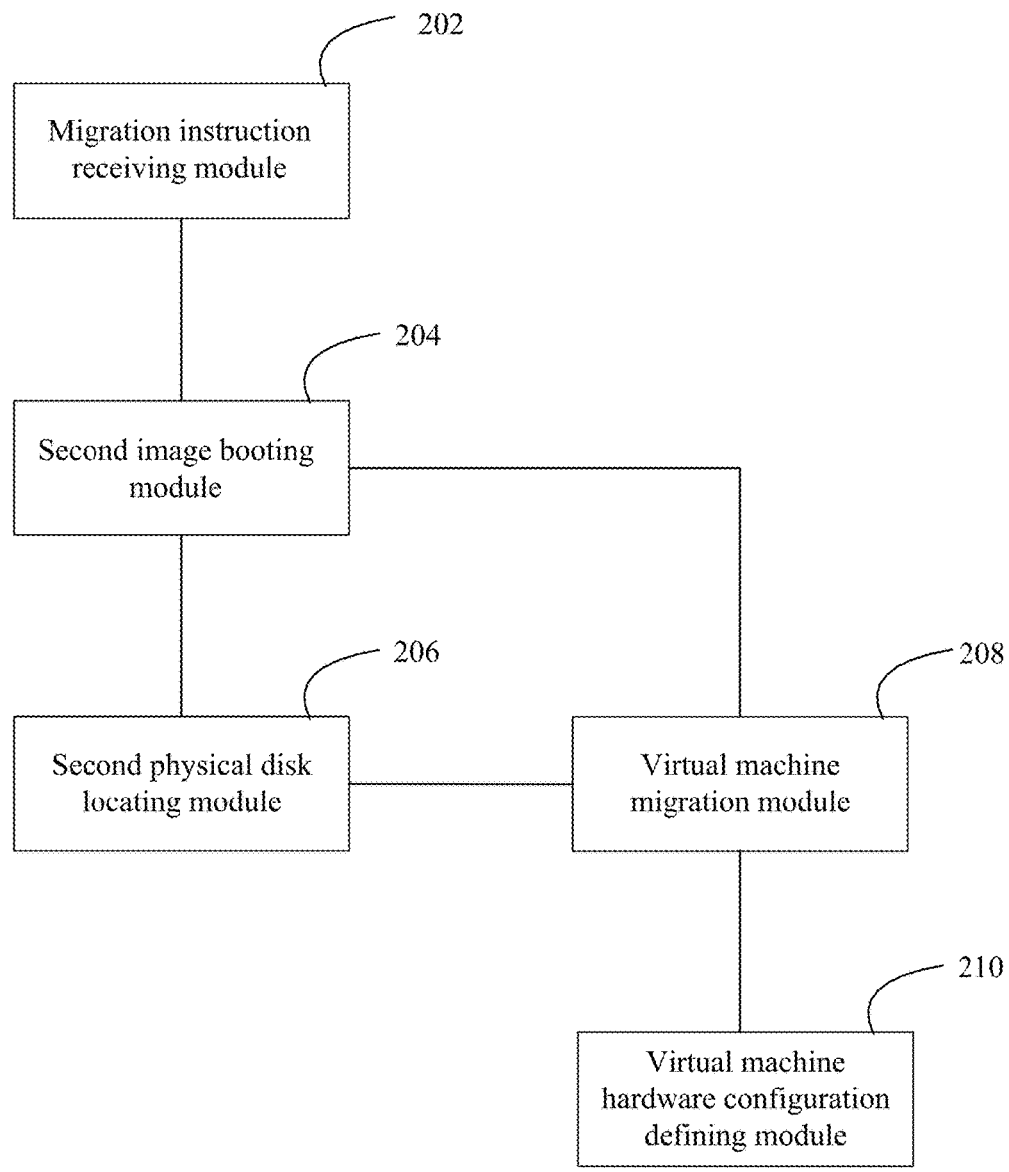
FIG. 7 illustrates a block diagram of an exemplary physical to virtual migration system consistent with the disclosed embodiments.

FIG. 7 illustrates a block diagram of an exemplary physical to virtual migration system according to disclosed embodiments. As shown in FIG. 7, the migration system may include a migration instruction receiving module 202, a second image booting module 204, a second physical disk locating module 206, and a virtual machine migrating module 208.

The migration instruction receiving module 202 is configured to receive a physical computer migration instruction inputted by a user, and to extract a destination network address of a corresponding destination virtual machine management computer is extracted.

The second image booting module 204 is configured to load a virtual machine management system mirror image file after restarting the physical computer and to boot the physical computer system into the virtual machine management system.

The second physical disk locating module 206 is configured to obtain physical disks of the physical computer. The virtual machine migrating module 208 is configured to copy data on the disks of the physical computer and to send copied data to the destination virtual machine management computer at the corresponding destination network address.

Further, the physical to virtual migration system may also include a virtual machine hardware configuration defining module 210. The virtual machine hardware configuration defining module 210 is configured to obtain virtual machine hardware configuration information inputted by the user and to send the virtual machine hardware configuration information as virtual machine creation parameters to the virtual machine management computer.

Further, the virtual machine hardware configuration defining module 210 is configured to receive a virtual machine hardware configuration information response returned by the virtual machine management computer to determine if the received virtual machine hardware configuration information satisfies a migration condition. If the received virtual machine hardware configuration information is determined not to satisfy the migration condition, i.e., the response is negative, the virtual machine hardware configuration defining module 210 is configured to prompt the user that it is unable to migrate the virtual machine.

Figure 8:
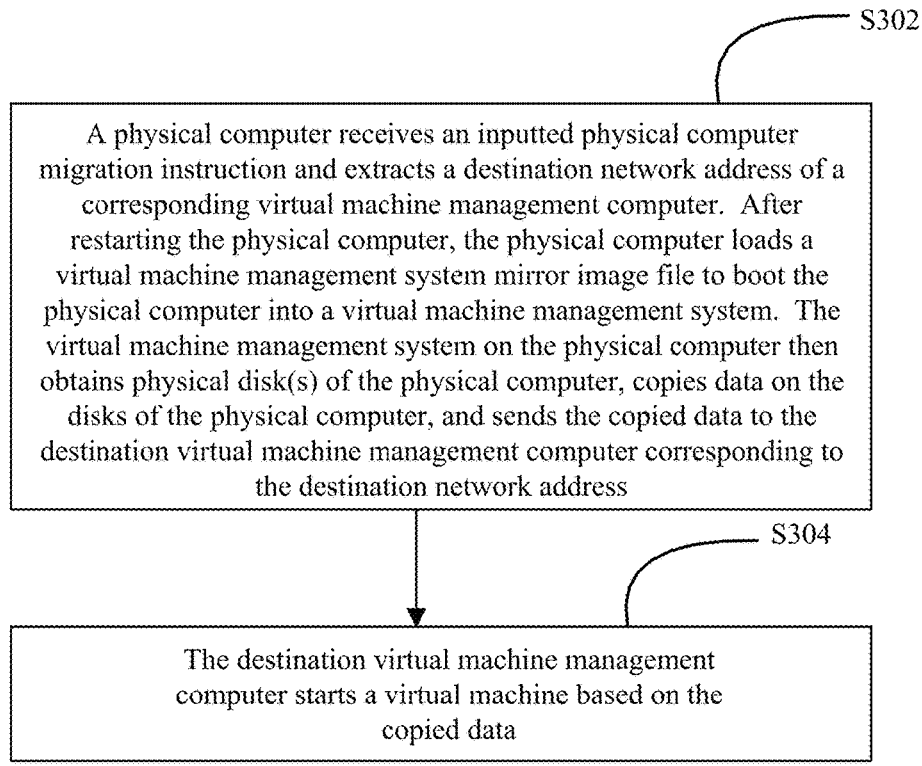
FIG. 8 illustrates a flow chart of an exemplary physical to virtual migration process consistent with the disclosed embodiments.

FIG. 8 illustrates a schematic flow chart of an exemplary physical to virtual migration method by a physical to virtual migration system according to the disclosed embodiments. As shown in FIG. 8, the migration method may include the following steps.

Step S302, a physical computer receives an inputted physical computer migration instruction and extracts a destination network address of a corresponding virtual machine management computer. After restarting the physical computer, the physical computer loads a virtual machine management system mirror image file to boot the physical computer into a virtual machine management system. The virtual machine management system on the physical computer then obtains physical disk(s) of the physical computer, copies data on the disks of the physical computer, and sends the copied data to the destination virtual machine management computer corresponding to the destination network address.

Step S304, the destination virtual machine management computer starts a virtual machine based on the copied data.

Further, copying the data on the disks of the physical computer further includes the following steps: obtaining a usage status bitmap information of the disks of the physical computer and, based on the bitmap information, performing incremental copying of the data on the disks of the physical computer.

FIG. 5 also illustrates a corresponding physical to virtual migration system. As shown in FIG. 5, the system includes a physical computer 10 and a virtual machine management computer 20.

The physical computer 10 is used to receive an inputted physical computer migration instruction and to extract a destination network address of a corresponding virtual machine management computer. After restarting the physical computer, the physical computer is used to load a virtual machine management system mirror image file to boot the physical computer into a virtual machine management system. The virtual machine management system on the physical computer is then used to obtain physical disk(s) of the physical computer, to copy data on the disks of the physical computer, and to send the copied data to the destination virtual machine management computer corresponding to the destination network address.

The virtual machine management computer 20 is used to start a virtual machine based on the copied data. Further, the physical computer 10 is further used to obtain a usage status bitmap information of the obtained disks of the physical computer and to perform incremental copy based on the bitmap information.

Figure 9:
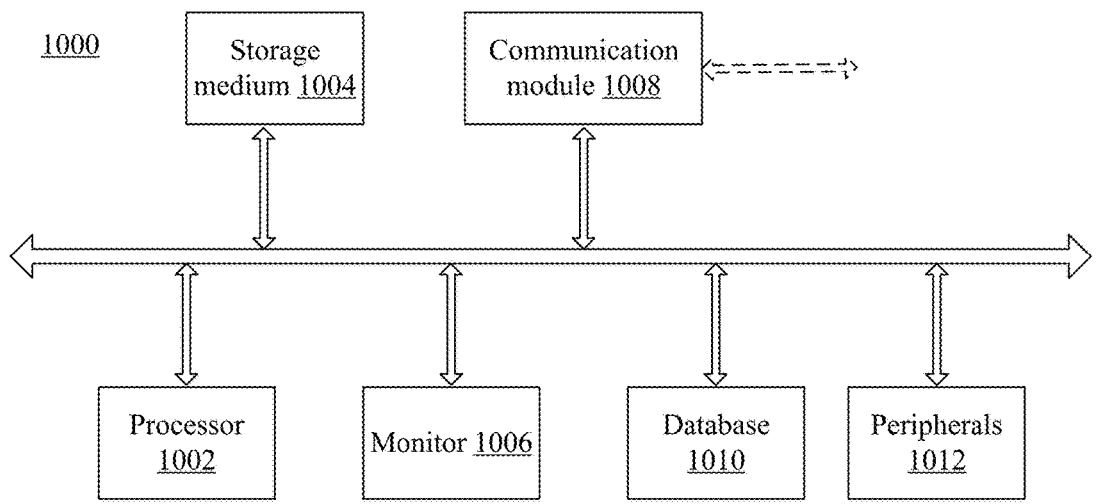
FIG. 9 illustrates a schematic block diagram of an exemplary computer system consistent with the disclosed embodiments.

FIG. 9 illustrates a computer system that may be used to implement the disclosed physical computer and/or the virtual machine management computer. As shown in FIG. 9, the computer system 1000 may include a processor 1002, a storage medium 1004, a monitor 1006, a communication module 1008, a database 1010, and peripherals 1012. Certain devices may be omitted and other devices may be included.

Processor 1002 may include any appropriate processor or processors. Further, processor 1002 can include multiple cores for multi-thread or parallel processing. Storage medium 1004 may include memory modules, such as ROM, RAM, flash memory modules, and erasable and rewritable memory, and mass storages, such as CD-ROM, U-disk, and hard disk, etc. Storage medium 1004 may store computer programs for implementing various processes, when executed by processor 1002.

Further, peripherals 1012 may include I/O devices such as keyboard and mouse, and communication module 1008 may include network devices for establishing connections through the communication network. Database 1010 may include one or more databases for storing certain data and for performing certain operations on the stored data.

Thus, by using the disclosed methods and systems, the operating system on the disks of the physical computer may be either virtualized directly on the physical computer, or may be migrated to the virtual machine management computer. The disclosed physical to virtual migration method can be run directly on the physical computer. After restart, the user may enter the local virtual machine management system. And the user may configure or set the disks of the physical disks as the read/write address of the created or the migrated virtual machine to implement local virtualization and virtual machine migration. Thus, no separate facilitating physical computer is needed, improving the operation convenience.

The embodiments disclosed herein are exemplary only and not intended to limit the scope of this disclosure. Various alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A physical computer virtualization method, comprising:
receiving a virtualization instruction inputted by a user on a physical computer;
restarting the physical computer;
loading the physical computer with a virtual machine management system mirror image file after restarting the physical computer to boot the physical computer into a virtual machine management system;
obtaining physical disks of the physical computer;
creating a virtual machine through the virtual machine management system and using the physical disks of the physical computer,
wherein, when the virtual machine is created, the virtual machine is not allocated with virtual disks using files or disk blocks virtualizing the physical disks, and the virtual machine uses the physical disks as the disks of the virtual machine, such that the physical computer running in the virtual machine mode can be tested without a physical-to-virtual migration.

2. The physical computer virtualization method according to claim 1, wherein:
the virtual machine is created on the physical computer locally corresponding to the physical computer and uses the physical disks of the physical computer.

3. The physical computer virtualization method according to claim 2, further including:
receiving, by the created virtual machine, a virtual machine creation instruction and configuration parameters inputted by the user;
allocating virtual disks and creating a second virtual machine based on the configuration parameters.

4. The physical computer virtualization method according to claim 2, further including:
receiving a status checking request of a virtual machine;
obtaining status information of the requested virtual machine; and
returning a response through a webUI interface.

5. The physical computer virtualization method according to claim 2, further including:
receiving a backup request for a virtual machine;
extracting a corresponding virtual machine identifier and a backup address;
backing up disks or files of the requested virtual machine with the corresponding virtual machine identifier to the backup address.

6. The physical computer virtualization method according to claim 1, wherein:
the virtualization instruction is a migration instruction that includes a destination network address of a corresponding destination virtual machine management computer; and the virtual machine is created remotely on the destination virtual machine management computer corresponding to the physical computer to be migrated.

7. The physical computer virtualization method according to claim 6, wherein
creating the virtual machine further includes:
copying data on the physical disks of the physical computer; and
sending the copied data to the destination virtual machine management computer at the corresponding destination network address to create the virtual machine.

8. The physical computer virtualization method according to claim 7, wherein
copying the data on the physical disks of the physical computer further includes:
obtaining a usage status bitmap information of the physical disks of the physical computer; and
based on the bitmap information, performing incremental copying of the data on the physical disks of the physical computer.

9. The physical computer virtualization method according to claim 7, before
restarting the physical computer, further including:
obtaining virtual machine hardware configuration information inputted by the user; and
sending the virtual machine hardware configuration information as virtual machine creation parameters to the virtual machine management computer.

10. The physical computer virtualization method according to claim 9, after
obtaining the virtual machine hardware configuration information, further including:
obtaining a virtual machine hardware configuration information response returned by the virtual machine management computer;
determining whether the virtual machine hardware configuration information satisfies a migration condition; and
when it is determined that the virtual machine hardware configuration information does not satisfy the migration condition, prompting the user that it is unable to migrate the physical computer.

11. A physical computer virtualization system, comprises:
a virtualization instruction receiving module configured to receive a virtualization instruction inputted by a user on a physical computer and to restart the physical computer;
a first image file booting module configured to load the physical computer with a virtual machine management system mirror image file after restarting the physical computer to boot the physical computer into a virtual machine management system;
a first physical disk locating module configured to obtain physical disks of the physical computer system; and
a local virtualization module configured to create a virtual machine through the virtual machine management system, wherein disks of the created virtual machine uses the disks of the corresponding physical computer system,
wherein, when the virtual machine is created, the virtual machine is not allocated with virtual disks using files or disk blocks virtualizing the physical disks, and the virtual machine uses the physical disks as the disks of the virtual machine, such that the physical computer running in the virtual machine mode can be tested without a physical-to-virtual migration.

12. The physical computer virtualization system according to claim 11, further including:
a virtual machine creating module configured to obtain a virtual machine creation instruction and configuration parameters inputted by the user, to allocate virtual disks and to create a second virtual machine based on the configuration parameters.

13. The physical computer virtualization system according to claim 11, further including:
a virtual machine status checking module configured to:
receive a status checking request of a virtual machine;
obtain status information of the requested virtual machine; and
return a response through a webUI interface.

14. The physical computer virtualization system according to claim 11, further including:
a virtual machine backup module configured to:
receive a backup request for a virtual machine;
extract a corresponding virtual machine identifier and a backup address;
back up disks or files of the requested virtual machine with the corresponding virtual machine identifier to the backup address.

15. A physical to virtual migration system, comprising:
a migration instruction receiving module configured to receive a physical computer migration instruction inputted by a user on a physical computer and to extract a destination network address of a corresponding virtual machine management computer;
a second image file booting module configured to load a virtual machine management system image file after restarting the physical computer and to boot the physical computer into a virtual machine management system;
a second physical disk locating module configured to obtain physical disks of the physical computer; and
a virtual machine migration module configured to copy data on the physical disks of the physical computer and to send the data to the destination virtual machine management computer with the corresponding destination network address.

16. The physical to virtual migration system according to claim 15, further including:
a virtual machine hardware configuration defining module configured to obtain virtual machine hardware configuration information inputted by the user and to send the virtual machine hardware configuration information as virtual machine creation parameters to the virtual machine management computer.

17. The physical to virtual migration system according to claim 16, wherein:
the virtual machine hardware configuration defining module is further configured to:
receive a virtual machine hardware configuration information response returned by the virtual machine management computer;
determine whether the virtual machine hardware configuration information satisfies a migration condition; and
when it is determined that the virtual machine hardware configuration information does not satisfy the migration condition, prompt the user that it is unable to migrate the physical computer.

18. The physical to virtual migration system according to claim 15, wherein, to copy data on the physical disks of the physical computer, the virtual machine migration module is further configured to:

obtain a usage status bitmap information of the physical disks of the physical computer; and based on the bitmap information, perform incremental copying of the data on the physical disks of the physical computer.

\* \* \* \* \*